United States Patent
Riddle

[11] 3,908,974
[45] Sept. 30, 1975

[54] SEAT SPRING WITH EXTENDER SPRING
[75] Inventor: Neville L. Riddle, Lexington, Ky.
[73] Assignee: Hoover Ball and Bearing Company, Saline, Mich.
[22] Filed: May 16, 1974
[21] Appl. No.: 470,368

[52] U.S. Cl. ................................................. 267/102
[51] Int. Cl. .............................................. F16f 3/02
[58] Field of Search .................................... 267/102

[56] References Cited
UNITED STATES PATENTS
3,145,986   8/1964   Vogel .................................. 267/102
3,593,979   7/1971   Crosby ................................ 267/102

Primary Examiner—James B. Marbert
Attorney, Agent, or Firm—Olsen and Stephenson

[57] ABSTRACT

A sinuous spring strip is provided at one end with an extender spring which is positioned above and mounted on the spring strip. The extender spring consists of a wire body formed at its front end with a transversely extending bar adapted to support the usual border wire and at its opposite end with a hook that is engaged over one of the torsion bars in the spring strip. Intermediate at its ends, the wire body is formed with a transverse bar that is located on top of and is clipped to another one of the torsion bars in the spring strip. In between the hook and the intermediate transverse bar, the wire body extends underneath a third torsion bar.

5 Claims, 4 Drawing Figures

U.S. Patent  Sept. 30,1975  3,908,974

SEAT SPRING WITH EXTENDER SPRING

BACKGROUND OF THE INVENTION

Extender springs have been commonly used on seat springs for seating structures that employ one or more seat cushions. The extender spring performs the function of insuring that the gap between the cushion and the spring deck is filled. An example of a spring assembly of this type is shown in Vogel U.S. Pat. No. 3,145,986. Prior art spring assemblies of this type have been unsatisfactory for several reasons. First of all, the attachment of the extender spring to the spring strip has not been sufficiently secure to enable use of the assembly over a prolonged service life. In addition, prior art structures have often acquired a plurality of spring clips to secure the extender spring to the sinuous strip. Further, since various spring assemblies require extender springs of varying size, it has been difficult to adapt a single extender spring configuration to a plurality of spring installation requirements. Accordingly, it is an object of the present invention to provide an improved extender spring and main spring assembly which overcomes these shortcomings in the prior art.

SUMMARY OF THE INVENTION

The extender spring of this invention, when viewed from above, consists of a wire body shaped to provide three transverse bars that are spaced apart in a direction longitudinally of the body, a hook at one end of the body and straight longitudinally extending portions interconnecting the bars and the hook. The front end bar is adapted to be connected to the border wire. A second transverse bar adjacent the end bar is used for mounting the conventional furniture edge roll. A third transverse bar, usually referred to hereinafter as the intermediate transverse bar, is secured by a clip to the top side of one of the spring strip torsion bars. The hook is hooked over another one of the spring strip torsion bars and the straight portion of the wire body between the hook and the intermediate transverse bar extends underneath a third torsion bar in the spring strip. In a vertical plane, the wire body can be bent as necessary to locate the end transverse bar at a desired height and to enable easy hooking of the hook over a torsion bar. Thus, the combination of the hook and the clip provides for a secure attachment of the extender spring to the sinuous strip and insures the assembly of the strip and the spring over a prolonged service life. This assembly is advantageous because it requires only a single clip.

Importantly, the length of the straight portion between the second and third transverse bars can be varied to thereby vary the effective length of the extender spring. This provides for use of the extender spring in various sizes to adapt it to a variety of spring assemblies. In summary, therefore, the spring assembly of this invention is advantageous because it can readily be manufactured, is securely attached to its supporting spring strip and requires only a single mounting clip.

Further objects, features and advantages of this invention will become apparent from a consideration of the following description, the appended claims, and the accompanying drawing in which;

Figure 1:
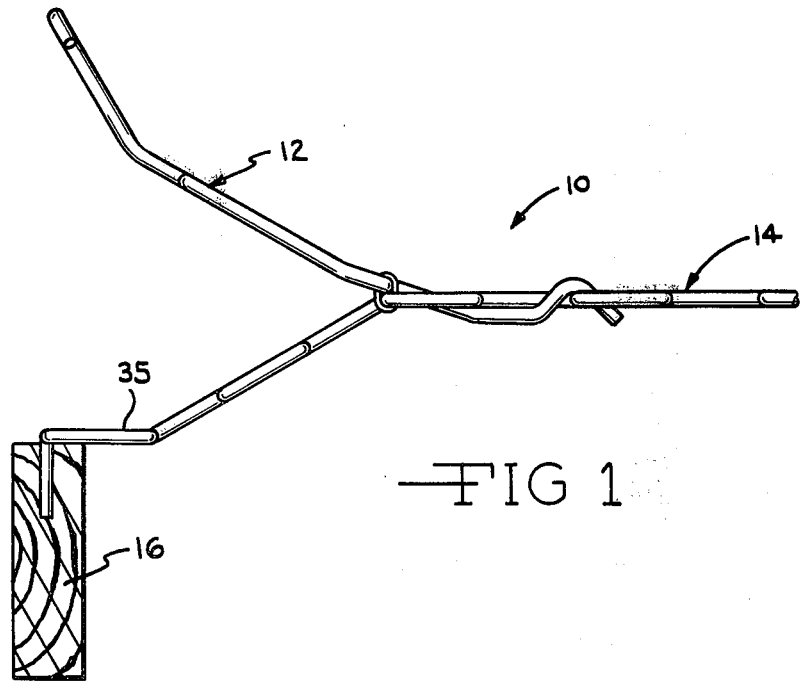
FIG. 1 is a fragmentary side elevational view of the extender spring of this invention shown in assembly relation with a frame mounted seat spring.
Figure 3:
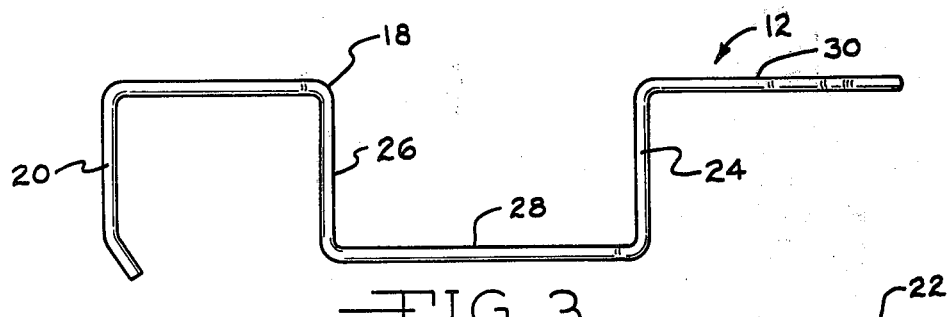
FIG. 3 is a plan view of the extender spring of this invention.
Figure 4:
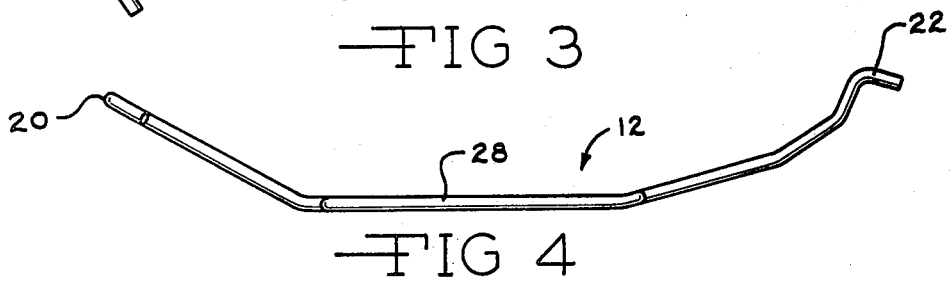
FIG. 4 is a side elevational view of the extender spring shown in FIG. 3.

With reference to the drawing, the spring assembly of this invention, indicated generally at 10, is illustrated in FIG. 1 as consisting of an extender spring 12 mounted on the front end of a sinuous spring strip 14 which is conventionally mounted on a seating frame, only the front rail 16 of which is shown. The extender spring is shown in FIGS. 3 and 4 as consisting of a wire body 18 formed at its front end with a transverse bar 20 and at its rear end with a hook 22. An intermediate transverse bar 24 is disposed between the transverse bar 20 and the hook 22. Another transverse bar 26 is located between the intermediate bar 24 and the front bar 20. The bar 26 is located adjacent and in a pre-established spaced relation with the bar 20 for a purpose to appear later. The body 18 has portions 28 and 30 which extend in opposite directions from opposite ends of the intermediate bar 24 and are substantially straight when viewed from above, as viewed in FIG. 3.

The seat spring strip 14 is illustrated as being formed of the well known sinuous wire, although the exact shape of the spring 14 is not critical to this invention, so long as the spring 14 has a plurality of properly located torsion bars. Because it is formed of sinuous wire, the spring 14 has a plurality of straight torsion bars 32 which are substantially parallel with adjacent ends of adjacent torsion bars being connected by curved connecting sections 34 which are of generally U-shape.

As shown in FIG. 1, the front end 35 of the spring 14 is pronged into the rail 16. The springs 12 and 14 are assembled by hooking the extender spring hook 22 over the top side of one of the seat spring torsion bars 32. The straight portion 30 of the spring 12 extends under the next adjacent torsion bar 32 and the intermediate transverse bar 24 in the spring 12 is positioned on the top side of and in a side-by-side relation with the next torsion bar 32. A spring clip 36 connects the side-by-side bars 24 and 32. As used herein, the term "side-by-side" is inclusive of engaged parallel bars lying in horizontal, vertical or inclined planes and the term is intentionally used in this manner because it is often difficult to ascertain exactly where clipped wires are with respect to each other, except that the clip keeps them "side-by-side."

The extender spring straight portion 28 extends upwardly and forwardly from the clip 36 so as to locate the transverse bar 20 above the front end 36 of the spring 14. The bar 20 is intended to provide a support for the usual border wire found in seat spring assemblies. The bar 26 is to be used for attaching the conventional furniture edge roll found in upholstery covering for seat spring assemblies. For this reason, the transverse bar 26 is located adjacent and in a pre-established spaced relation with the bar 20.

In the manufacture of the extender spring 12, the length of the straight section 28 is readily variable to adapt the spring 20 to a variety of seat spring installations wherein the shape of the main spring 14 varies and the location of the torsion bar 20 must always be directly above the spring front end 35. The extender spring 12 is readily assembled with the main spring 14 since it is only necessary to snap the hook 22 onto one torsion bar 32 and clip the transverse bar 24 to another torsion bar 32. The requirement for a single clip 36 not only simplifies the assembly but also reduces the cost of assembly. Once the extender spring 12 is installed, it is securely attached to the seat spring 14 so that the assembly will remain in place over a prolonged service life with the usual hard use of the spring assembly 10. Downward forces on the portion of the spring 12 forwardly of the clip 36 will be resisted by the torsion bar 32 which engages the top side of the straight spring portion 30. Upward forces on the portion of the spring 12 forwardly of the clip 36 are resisted by the torsion bar 32 on which the hook 22 is mounted.

Figure 2:
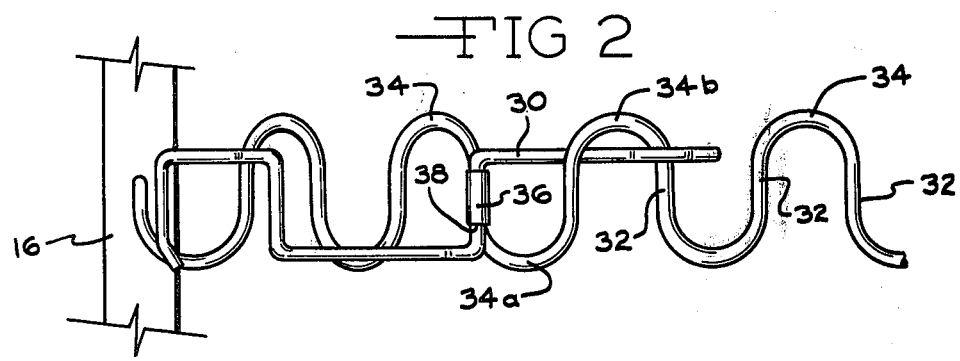
FIG. 2 is a top view of the spring assembly shown in FIG. 1.

As shown in FIG. 2, the spring clip 36 is mounted so that one end 38 of the clip engages the adjacent curved connecting section indicated at 34a. This engagement of the clip 38 and the section 34a prevents the spring 12 from shifting sideways in one direction, namely, a direction toward the section 34a on the spring 14. The straight spring portion 30 is positioned so that it engages the adjacent curved connecting section indicated at 34b. This engagement prevents the spring 12 from shifting in the opposite direction on the spring 14. As a result, the springs 12 and 14 are securely maintained in assembly relation during use of the spring assembly 10. This enables prolonged use of the extender spring 12 for its intended purpose.

From the above description it is seen that this invention provides a spring assembly 10 consisting of an extender spring 12 and a sinuous seat spring strip 14 which are readily assembled with only a single clip 36 and when so assembled are securely attached together so that the spring assembly will withstand hard use over a prolonged time period. By virtue of the construction of the extender spring 12 with the uninterrupted portion 28 between the bars 24 and 26, the extender spring 12 can be made in various sizes to adapt to various spring installations by merely manufacturing the spring 12 with a section 28 of the desired length.

What is claimed is:

1. In combination with a spring strip having a plurality of transversely extending torsion bars spaced apart longitudinally of the strip, an extender spring positioned above and mounted on one end of said strip, said spring comprising a wire body formed at one end with a transversely extending bar and at the opposite end with a hook engaged with a first one of said torsion bars, said wire body having a transverse bar located intermediate said end bar and said hook positioned side-by-side with a second one of said torsion bars, clip means securing said side-by-side bars together, and said body having portions extending in opposite directions from opposite ends of said intermediate transverse bar which are substantially straight when viewed from above, one of said straight portions terminating in said hook which is engaged with one side of said first torsion bar, said one straight portion being engaged with the opposite side of a third one of said torsion bars located between said first and second torsion bars.

2. The structure according to claim 1 wherein said hook is hooked over the top side of said first torsion bar, said intermediate transverse bar is disposed on the top side of its side-by-side torsion bar, and the straight portion of said body extending between said intermediate transverse bar and said hook extends under said third torsion bar in said strip.

3. The structure according to claim 1 wherein said extender spring includes a third transverse bar located adjacent said end transverse bar and the straight portion of said body extending from said intermediate transverse bar toward said end transverse bar is uninterrupted between said intermediate and third transverse bars.

4. The structure according to claim 2 wherein said spring strip is formed of sinuous wire so that each torsion bar is straight and is joined to an adjacent torsion bar at corresponding ends by a curved connecting section and wherein said clip means is located on said second one of said torsion bars so that one end of said clip means is adjacent the curved connecting section at one end of said second torsion bar to thereby prevent shifting movement of said extender spring in one direction on said torsion bar.

5. The structure according to claim 4 wherein said one straight portion of said body extending between said hook and said intermediate torsion bar is located at the opposite end of said clip means and is engageable with a curved connecting section in said sinuous strip to prevent shifting of said extender spring in the opposite direction.

* * * * *